United States Patent [19]

Ishihara et al.

[11] 4,324,306
[45] Apr. 13, 1982

[54] ENGINE SUPPORTING STRUCTURE FOR MOTORCYCLE

[75] Inventors: Takeo Ishihara, Asaka; Hidehiko Inoue, Saitama; Yuji Kishizawa, Kawagoe; Tsutomu Hayashi, Hoya, all of Japan

[73] Assignee: Honda Giken Kogyo Kabushiki Kaisha, Tokyo, Japan

[21] Appl. No.: 85,403

[22] Filed: Oct. 17, 1979

[30] Foreign Application Priority Data

Oct. 17, 1978 [JP] Japan .................................. 53/127721

[51] Int. Cl.³ .............................................. B62K 11/04
[52] U.S. Cl. ...................................... 180/228; 248/638
[58] Field of Search ............... 180/219, 220, 227, 228, 180/54 R, 54 F, 299; 248/564, 567, 658, 589, 592, 596, 638, 585, 587, 610, 611, 634, 659

[56] References Cited

U.S. PATENT DOCUMENTS

| 2,028,549 | 1/1936 | Lord | 248/589 |
| 2,091,698 | 8/1937 | Anthony et al. | 180/228 |
| 2,950,625 | 8/1960 | Jaulmes | 180/228 |
| 4,019,594 | 4/1977 | Koyama | 180/228 |
| 4,066,142 | 1/1978 | Hooper | 180/228 |
| 4,076,271 | 2/1978 | Doncque | 180/227 |

FOREIGN PATENT DOCUMENTS

| 348884 | 10/1960 | Fed. Rep. of Germany | 180/219 |
| 1035506 | 6/1950 | Italy | 180/228 |

Primary Examiner—Joseph F. Peters, Jr.
Assistant Examiner—Randall A. Schrecengost
Attorney, Agent, or Firm—Irving M. Weiner; Pamela S. Burt; John L. Shortley

[57] ABSTRACT

An improved engine supporting structure for a motorcycle wherein a power unit is constructed integrally of an engine, a crankcase and a transmission case and is subjected to pivotal motions with respect to the frame together with a rear wheel. The engine is so arranged that its main axis of inertia is substanially horizontal, and the engine constituting a part of the power unit is pivotally connected to the lower end of a link which in turn has its upper end pivotally connected to the frame. The link is so arranged that its upper and lower pivots are substantially in a vertical line, and the rear portion of the power unit supporting the rear wheel is connected to the frame through a shock absorber. In this manner, the transmission of engine vibrations to the frame is restricted, the following characteristics of the rear wheel in the longitudinal direction are improved, and the riding quality is improved.

14 Claims, 7 Drawing Figures

ENGINE SUPPORTING STRUCTURE FOR MOTORCYCLE

BACKGROUND OF THE INVENTION

1. Field of the Invention

The present invention relates to improvements in a structure for supporting an engine upon the frame in a power unit swing type motorcycle.

2. Description of Relevant Art

A motorcycle of the power unit swing type is well known in the relevant art. In such type of motorcycle, the power system of an engine, a crankcase and a transmission case is integrated into a unit. The front portion of the unit is pivotally connected to a frame, and the rear portion of the unit is employed to support a rear wheel and is connected to the frame through a shock absorber. The unit is subjected to rocking motions about the pivot at the frame, together with the rear wheel.

There is one type of such a power unit wherein the transmission case is arranged in the longitudinal direction of the vehicle, while the engine is arranged in an upright position, i.e., substantially in a vertical orientation. In such a power unit, the main axis of inertia of the engine is substantially vertical so that the reciprocal movements of the engine piston as well as the main vibrating forces caused by rotational inertia of the crankshaft are transmitted as vertical vibrations to the frame, thereby deteriorating the riding quality of the motorcycle. If the motorcycle is parked with its stand in a lowered position while the engine is operating, the frame is vibrated in a vertical direction by the vertical vibrations of the engine. As a result, it is possible that the frame will be sufficiently vibrated up and down as to undesirably move the motorcycle.

In consideration of such problem, there has been provided an engine supporting system of the power unit swing type having the engine thereof arranged in the longitudinal direction so that the main axis of inertia thereof may be substantially longitudinal, i.e., horizontal. The power unit of this type is also supported upon the frame by pivotally connecting the engine to the frame at only one point by means of a pin. As a result, the power unit is mounted so as to theoretically accommodate the pivotal up and down motions about the pivot for the shock absorbing actions of the rear wheel, however, it is substantially rigid with respect to pivoting in the longitudinal direction. Therefore, in the event that the rear wheel rides over a projection on a road, it moves upwardly but not back and forth, and the resultant shocks will be transmitted to the frame. Thus, it is difficult in accordance with such known structure to obtain a satisfactory compliance of the rear wheel in the longitudinal direction, which compliance is expected as an important function of a suspension system of a motorcycle.

It is known to mount rubber bushes on the pivots of the engine to the frame, however, such rubber bushes are required to prevent vibrations as well as to bear the load of the power unit. Accordingly, the characteristics of the rubber bushes are at best only moderate with respect to both the vibration-preventing performance and the load bearing performance thereof. It is thus quite difficult to obtain sufficient vibration preventing characteristics and to satisfy the load bearing and shock absorbing characteristics of the power unit. It is also difficult to provide a power unit which provides sufficient compliance characteristics to the rear wheel in the longitudinal direction.

The present invention provides an effective and simplified solution to the aforementioned engine supporting problems which are encountered in a motorcycle of the power unit swing type.

SUMMARY OF THE INVENTION

The present invention provides an engine supporting structure for a motorcycle wherein the main axis of inertia of an engine, i.e., the cylinder thereof, is arranged substantially in the longitudinal direction of the motorcycle. The engine, constituting the front portion of the power unit, is pivotally connected to the lower end of a depending link having its upper end pivotally connected to the frame, and the upper and lower pivots of the link are arranged substantially in a vertical line. The rear portion of the power unit supporting a rear wheel is connected to the frame through a shock absorber.

According to the present invention, because the engine is supported in the vertical direction by means of the link, a link mechanism similar to a parallelogram is defined by the link, shock absorber, frame and power unit, and acts as a parallel link for the longitudinal and vertical motions of the rear wheel. Thus, the compliance of the rear wheel in the longitudinal directions is improved, while enhanced shock absorbing performance and enhanced riding comfort is also attained.

Further, in accordance with the present invention, because the engine is supported at two pivots upon the frame by means of a link which is arranged substantially in the vertical direction with respect to the engine, and because the main axis of inertia thereof is substantially horizontal and longitudinal with respect to the frame, the vibrations resulting from reciprocal movements of the engine to be transmitted to the frame are reduced and restricted to the greatest possible extent, in addition to the effects of the pivotal motions of the link. Other advantages thus attained by the present invention include the reduction of vibrations of the frame not only during running operation of the motorcycle, but also when the vehicle is parked, thus preventing undesirable movement of the parked vehicle.

It is an object of the present invention to provide an engine support which is excellent with respect to preventing engine vibrations, excellent with respect to accommodating the changes in road surface conditions, and excellent with respect to shock absorbing characteristics. Such effective support of the engine is accomplished by the present invention with a simplified construction.

Other objects and advantages of the present invention will become apparent from the following description, when read in conjunction with the accompanying drawings.

DETAILED DESCRIPTION OF PREFERRED EMBODIMENTS

Figure 1:
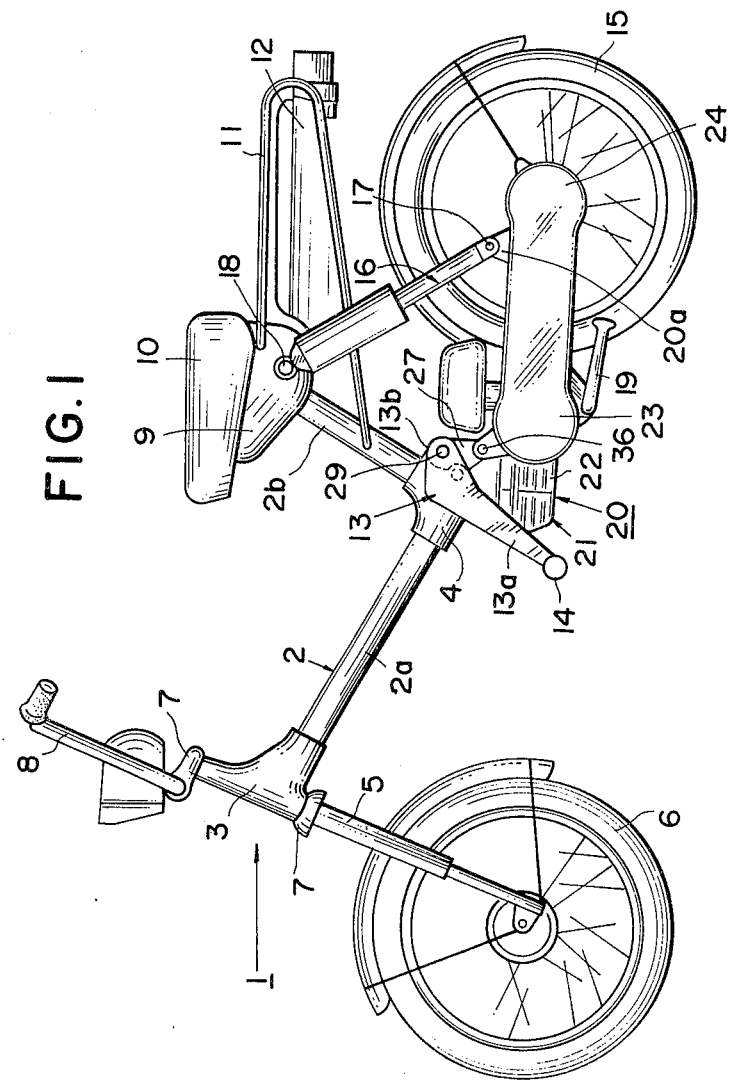
FIG. 1 is a diagrammatical side elevational view depicting an embodiment of a motorcycle to which the present invention is to be applied.

With reference to FIG. 1, a motorcycle 1 is shown, which is of the type having a small size and displacement. A frame 2 is made of a pipe material and includes a main frame 2a which extends downwardly at an inclination from a head tube 3 in front thereof, and a seat post 2b which extends upwardly at an inclination from the lower end of main frame 2a. The frame members 2a and 2b are connected at their lower ends by means of a joint 4 so that the frame 2 has a generally V-shaped side elevational configuration.

The head tube 3 supports at the inside thereof a front fork 5 which extends downwardly so as to support a front wheel 6. The upper portion of front fork 5 is supported by head tube 3 through top and bottom bridges 7 and 7, the top bridge 7 having a handle 8 mounted thereon. A seat 10 is mounted on the upper end of post 2b through a box-shaped supporting member 9. Rearwardly of supporting member 9 and post 2b is arranged a rear carrier 11, in which a fuel tank 12 is mounted.

A pair of brackets 13 and 13 having a generally inverted "L" shape depend respectively from each side of the V-shaped joint 4 of frame 2.

The front portions 13a of brackets 13 and 13 depend forwardly at an inclination and the upper portions 13b of brackets 13 and 13 extend rearwardly substantially in a horizontal direction. A bar is mounted between the front portions 13a of brackets 13 so as to provide a pair of oppositely-extending steps 14 projecting sidewardly, on which the feet of the driver are supported.

A power unit 20 having a unitary construction which includes an engine 21, a crankcase 23 and a transmission case 24, all of which are rigidly jointed, is also shown in FIG. 1. The engine 21 is arranged such that the cylinder block 22 thereof has its axis extending substantially horizontally. The crank-case 23 is disposed in alignment with the axis of the engine cylinder block 22 so as to be arranged substantially horizontally in the extension of the axis of cylinder block 22, together with transmission case 24. As a result, the reciprocating movements of a piston (not shown) which is received in a cylinder (not shown) are substantially horizontal, so that the direction of the moving inertia of the engine is accordingly substantially in the longitudinal direction of the motorcycle. Thus, the main axis of inertia of the engine is longitudinal with respect to the motorcycle so that the main vibrating force generated by the engine is substantially horizontal.

Figure 2:
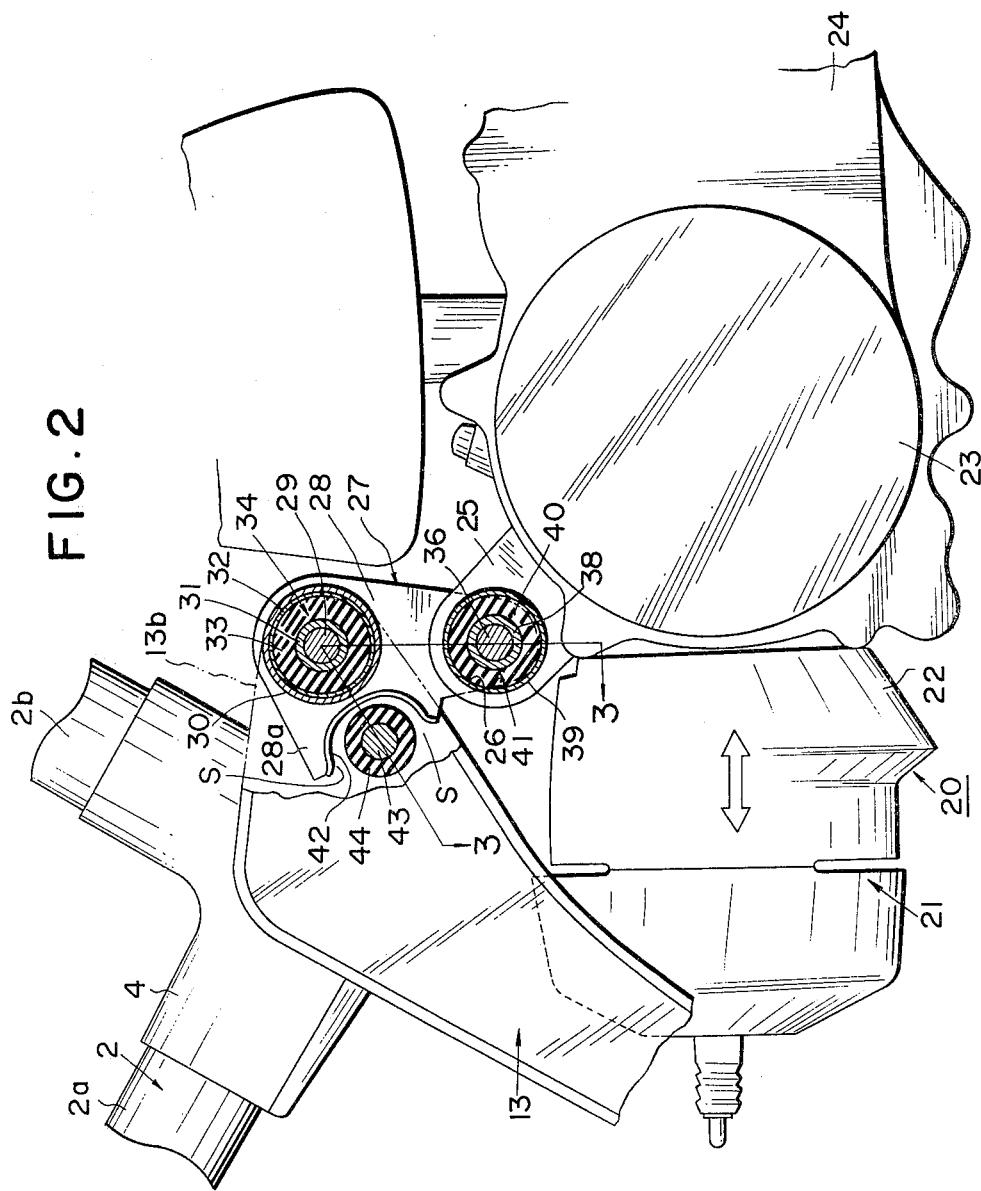
FIG. 2 is an enlarged side elevational view illustrating an engine supporting portion with the essential portion thereof being shown in a broken-away manner.
Figure 3:
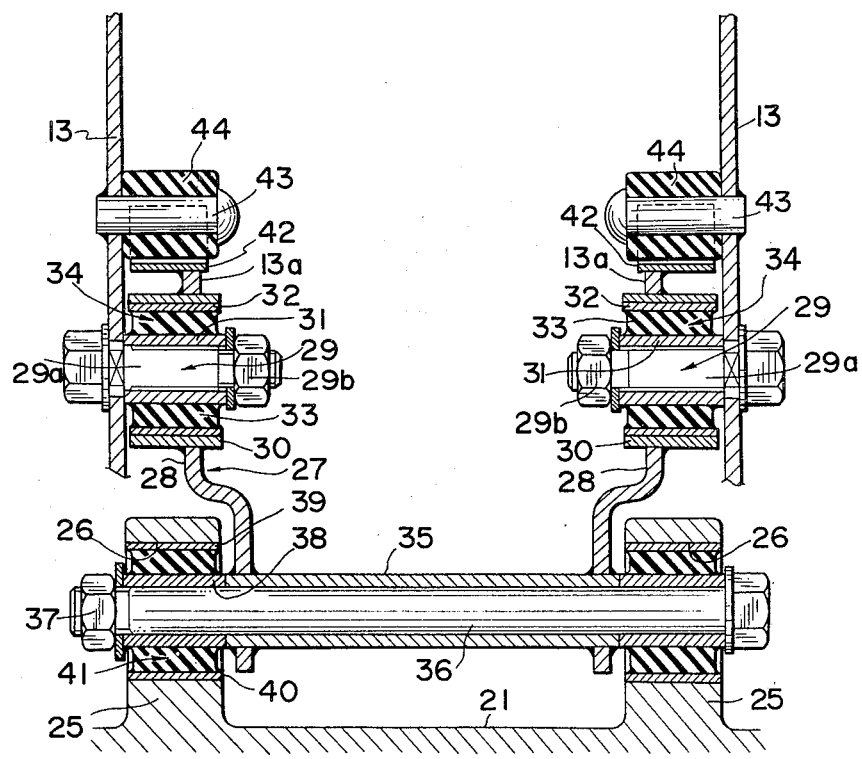
FIG. 3 is a sectional view taken along line 3—3 of FIG. 2.

With reference to FIGS. 2 and 3, a pair of supporting projections 25 and 25 are made integral with either the base portion of cylinder block 22 of power unit 20 or the front portion of crankcase 23. The projections 25 and 25 are spaced from each other in the widthwise direction, and are formed with mount holes 26 which extend transversely thereof. A link 27 is pivotally connected to each of the brackets 13 and 13 at the side of the frame. The link 27 includes a pair of pieces 28 and 28 which depend from the upper portions of brackets 13 and 13 while facing the same. Each of the pieces 28 and 28 has the upper portion thereof attached to the upper portion 13b of each of the brackets 13 and 13 by means of bolts and nuts 29a and 29b which act as a pivot pin 29. A collar 30 is fixed to the upper portion of each piece 28 of link 27 so as to extend transversely. Collars 31 and 32 are interposed between the inner circumference of collar 30 and the bolt 29a at the inner and outer circumferences thereof. Between the collars 31 and 32 is integrally interposed (by seizure) a rubber bush 34 having a rubber 33. Through the rubber bush 34, the pieces 28 and 28 constituting the link 27 are pivotally connected at their upper portions to the brackets 13 and 13 by means of pin 29.

The link 27 depends vertically downwardly from pivot 29, and the respective pieces 28 and 28 thereof have their lower portions bent in a widthwise direction, as shown in FIG. 3, to provide a pair of parallel lower portions, between which a cylindrical collar 35 is mounted so as to extend substantially horizontally. A bolt 36, acting as a pin, is inserted through the mount holes 26 which extend widthwise through the projections 25 and 25 at the side of engine 21. The collar 35 fixed to the lower ends of link 27 is fitted on the outer circumference of bolt 36 between projections 25 and 25. A rubber bush 41 is sandwiched between each of the mount holes 26 and 26 and bolt 36. The rubber bush 41 is mounted on the inner circumference of mount hole 26 and the outer circumference of bolt 36 by means of collars 38 and 39 which are made integral with the inner and outer circumferences of the rubber 40 of rubber bush 41. One end of bolt 36 is fastened by means of a nut 37.

The upper pivot 29 and the lower pivot 36 of link 27 are disposed on the same vertical line. The cylinder block 22 is arranged in a horizontal position and accordingly at a right angle with respect to link 27 which is arranged in the vertical direction while supporting brackets 13 and engine 21 at the two points 29 and 36. Thus, whereas the main axis of inertia of engine 21 is substantially horizontal, the engine 21 itself is supported by link 27 which in turn is supported at the two pivot points 29 and 36 which are disposed at a right angle with respect to the main axis of inertia, or in the same vertical line.

The plates 28 and 28 constituting the link 27 are formed with extensions 28a (FIG. 2) which are disposed forwardly of upper pivot 29. An inverted C-shaped stopper 42 is formed in each of the extensions 28a, and a corresponding member such as a stud element in the form of a stopper pin 43 is provided on the frame by being anchored at the inner side of each of the brackets 13 and 13. A cushion rubber 44 is mounted around the outer circumference of each of the stopper pins 43, and a clearance S is normally established between the outer circumference of rubber 44 and stopper 42 formed at the link side.

With reference to FIG. 1, power unit 20, the front portion of which is suspended and supported by the portion of engine 21, has the rear portion thereof supported by a rear wheel 15. A supporting projection 20a, which projects from the upper rear portion of power unit 20, is pivoted at 17 to the lower end of a shock absorber 16 which constitutes the rear cushion unit of the motorcycle. The upper end of shock absorber 16 is pivoted at 18 to supporting member 9 which is mounted on post 2b at the side of frame 2, thus supporting the rear portion of power unit 20 at the frame side. Also illustrated in FIG. 1 is a main stand 19 which is adapted to be positioned in upright and horizontal positions.

With the above-described structure, a link mechanism similar to a parallelogram is defined by the components including frame 2, power unit 20, link 27, and shock absorber 16, so that it functions as a parallel link.

The main axis of inertia of engine 21 is directed horizontally, and the direction of the main vibrating force of same is shown by the arrow in FIG. 2. On the other hand, the engine 21 itself is pivotally supported on brackets 13 at the two points 36 and 29 by means of link 27. Link 27 is arranged at a right angle with respect to the main axis of inertia of engine 21 so that the inertial mass of engine 21 in the longitudinal direction is exerted upon the engine pivot 36 and is converted into longitudinal movements about the other pivot 29 of link 27. As a result, the vibrations of the engine are absorbed through the pivotal motions of link 27 so that the vibratory component to frame 2 can be eliminated or reduced to a remarkably low level. Thus, transmission of engine vibrations to the frame is reduced as much as possible so that transmission of engine vibrations to the vehicular chassis can be blocked. Because the engine vibrations are absorbed by the pivotal motions of the link which is arranged at a right angle with respect to engine 21, the vibrations of the link and accordingly the mounting brackets 13 can be reduced and restricted to prevent their own vibrations and resonances, and to thereby prevent vibration of frame 2 due to secondary vibrations. As a result, even when the motorcycle is parked during running operation of the engine with the main stand 19 in its upright position, the vibrations of the chassis can be so remarkably reduced that unexpected movement of the motorcycle during the time that it is parked is prevented, thus ensuring stable parking.

Because the link mechanism similar to a parallel link is constituted of the link, frame, power unit and shock absorber, and because the main axis of inertia of engine 21 is horizontal, vibrations of the engine can be absorbed by the pivotal motions of shock absorber 16 at its pivots 17 and 18 so that vibrations from shock absorber 16 to the chassis can also be prevented. As described hereinabove, because the shock absorber is arranged to constitute a link mechanism similar to a parallel link, the difficulty encountered in conventional constructions with respect to installation and layout of the shock absorber is eliminated by the present invention, so that the degree of flexibility of the engine supporting structure is increased while enhancing the design quality.

Moreover, due to the provision of a link mechanism similar to a parallel link as described above, the following movements of the rear wheel in the longitudinal direction are effected smoothly by the pivotal motions of link 27 about pivot 29 and the rearward pivotal motions of power unit 20 about pivot 36. Thus, even if the rear wheel 15 encounters road roughness during running operation, it follows the roughness to move back and forth together with power unit 20, and the vibrations of and impacts upon the motorcycle can be effectively absorbed and attenuated with an enhanced shock absorbing function. Thus, the riding quality during running operation as well as the vibration preventing effect is considerably improved in comparison with the conventional structure.

Because the rubber bushes 34 and 41 are provided around between the pivot pin and bolt 29 and 36, the vibrations due to pivotal motions and the vibratory components of the engine can be further absorbed and attenuated to thereby further enhance the above-described effects.

In the foregoing embodiment, the pivots 29 and 36 of link 27 lie in a common vertical line and the main axis of inertia of engine 21 is at a right angle with respect to such vertical line. Alternatively, however, link 27 may be slightly inclined in the longitudinal direction, especially rearwardly, the engine may be arranged in a substantially horizontal position, and the link may be slightly inclined forwardly or rearwardly from the vertical line with a pre-set angular range. In this manner, changes in the angles are permitted if they do not impair functioning.

The back and forth movements of power unit 20 resulting from the shock absorbing actions of rear wheel 15 are followed and absorbed by the pivotal motions of link 27 about pivot 29. The extent of the pivotal motions can be regulated by the abutment between stopper 42 and the cushion rubber 44 of stopper pin 43. The impacts thereof can be absorbed and attenuated by the actions of the rubber 44.

Figure 4:
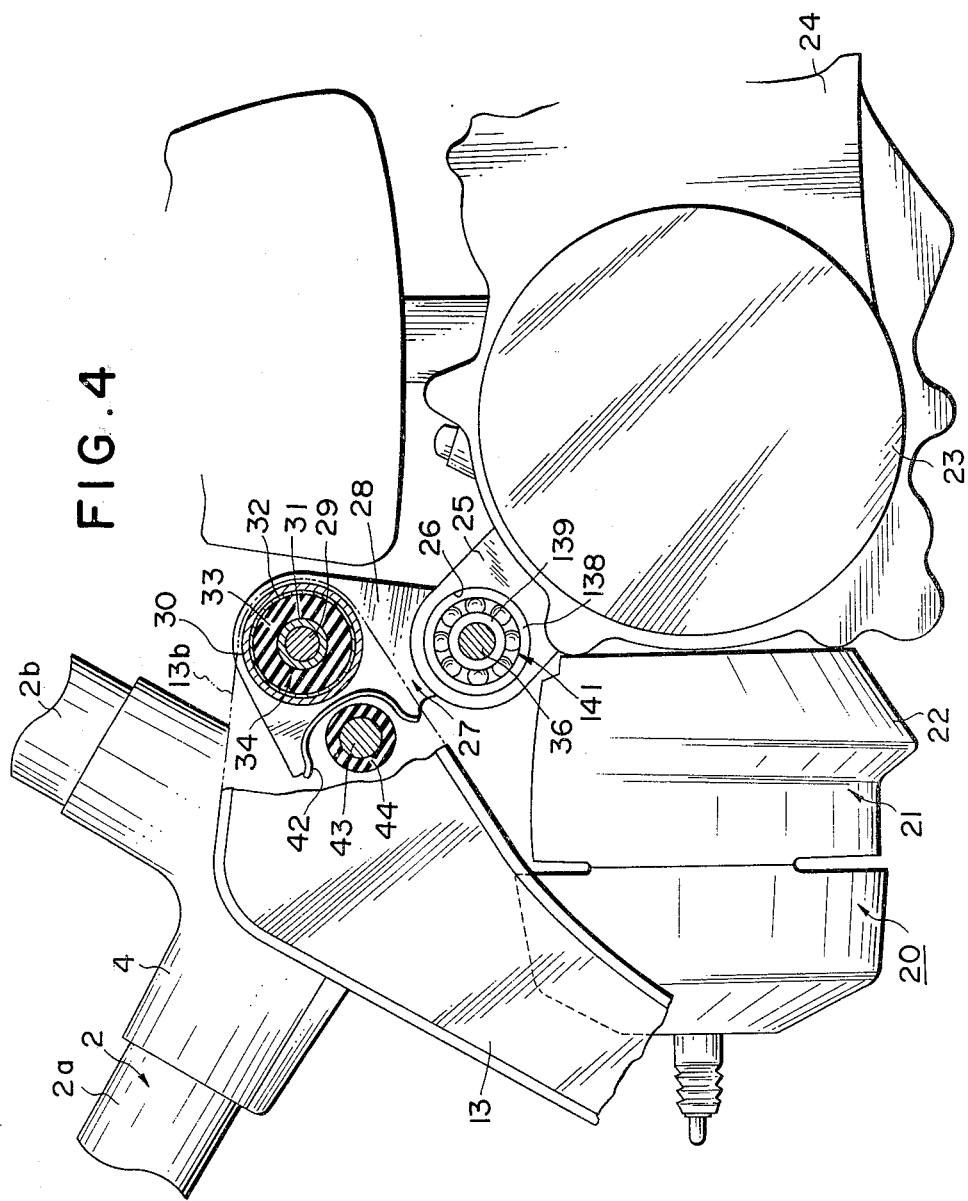
FIG. 4 is similar to FIG. 2, showing a second embodiment of the present invention.
Figure 5:
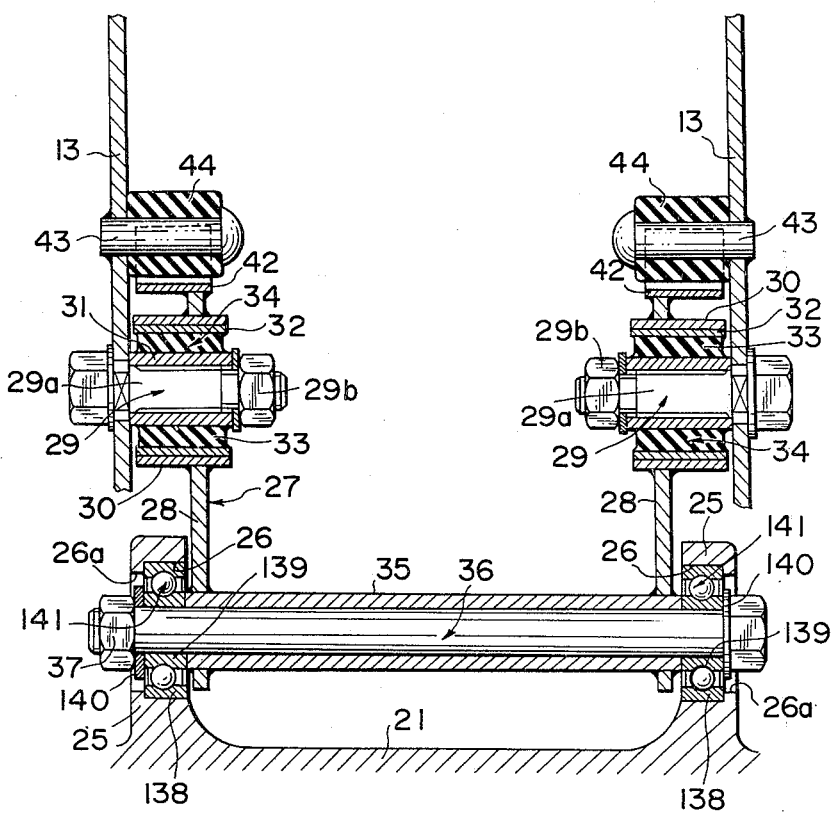
FIG. 5 is similar to FIG. 3, showing the second embodiment of FIG. 4.

With reference to FIGS. 4 and 5, a second embodiment of the present invention will be described. In this second embodiment, the pivotal portion at the engine side is modified, but the remaining portions remain unchanged, and are indicated by the same reference numerals.

Ball bearings 141 and 141 for bearing the loads in the radial direction are interposed between the bolt 36 constituting the lower pivots of pieces 28 and 28 of link 27 and the mount holes 26 of projections 25 and 25 at the side of engine 21. Each of the bearings 141 has an inner race 139 supported at one side thereof by a washer 140 and an outer race 138 supported on the stepped portion 26a which is formed at the side of mount hole 26. It is thus possible to improve the transverse rigidity at the pivot, to smoothen the rotations at the pivot by the bearing action, to smoothen the relative motions between link 27 and the pivot for the longitudinal vibrations of engine 21, and to enhance the vibration-preventing effects.

Figure 6:
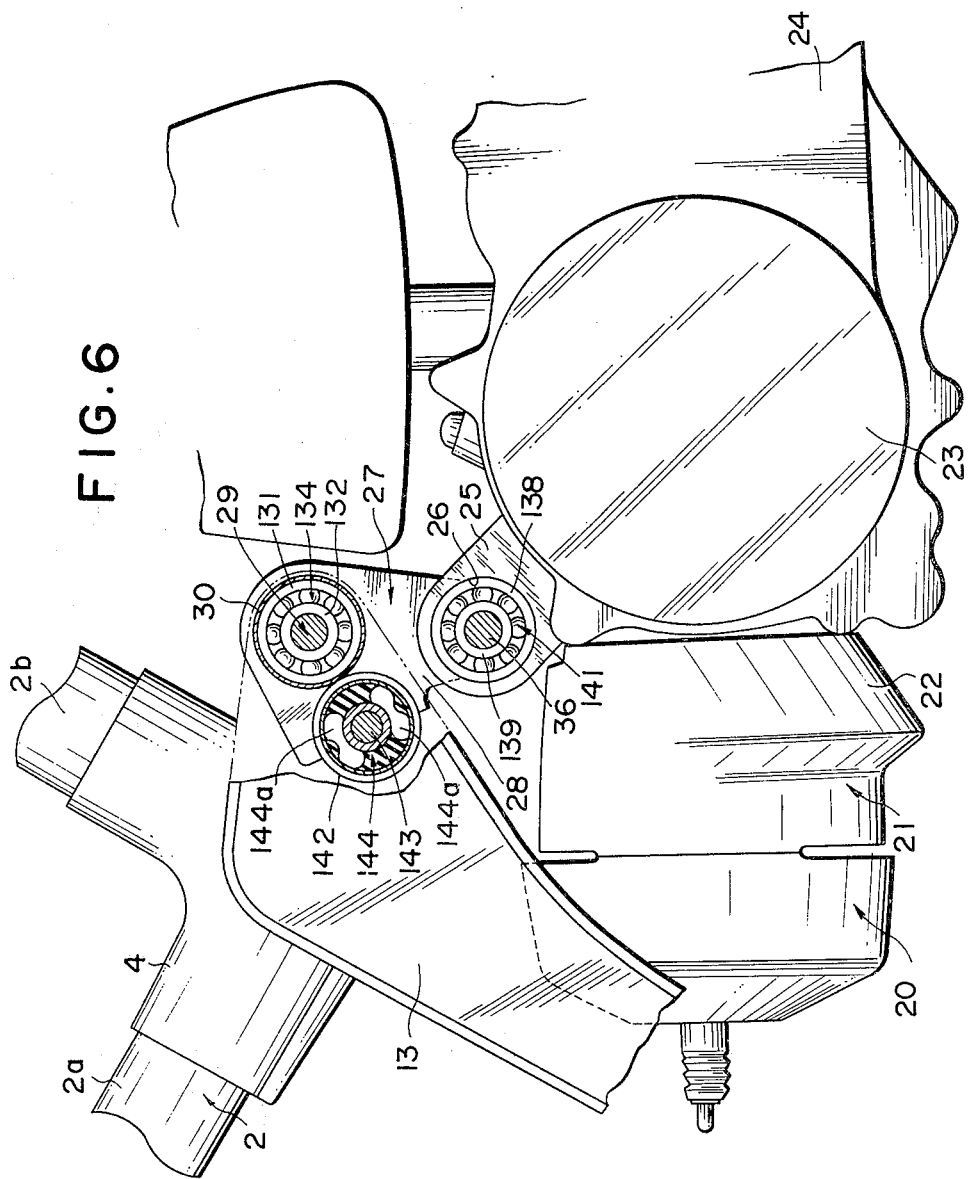
FIG. 6 is similar to FIGS. 2 and 4, showing a third embodiment of the present invention.
Figure 7:
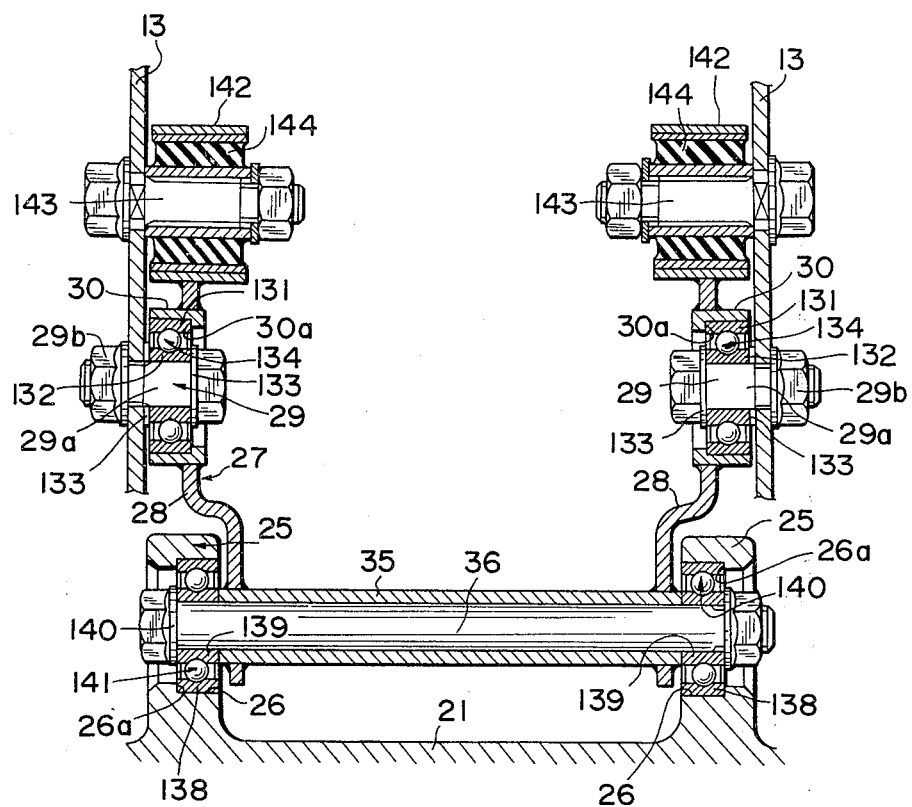
FIG. 7 is similar to FIGS. 3 and 5, showing the third embodiment of FIG. 6.

FIGS. 6 and 7 show a third embodiment of the present invention in which the frame side pivot is supported by means of a bearing in addition to the engine side pivot of the above-described second embodiment. The engine supporting structure according to the third embodiment is basically similar to that of the foregoing two embodiments, and like portions are designated by similar reference numerals.

A bearing 134 is interposed between collar 30 at the upper portion of piece 28 of link 27 and the bolt 29a so that it may bear the load in the radial direction. The bearing 134 has the inner race 132 thereof supported at one side thereof by means of a washer 133 and the outer race 131 thereof supported by the stepped portion 30a which is formed at one side of collar 30. A stopper collar 142 is fixed to a front portion of each of the pieces 28 and 28 and is fitted on the stopper rubber bush 144 which in turn is rotatably mounted on a bolt 143 mounted to project from bracket 13. The bush 144 is formed with hollow portions 144a which extend in the direction of the pivotal motions of the link, to thereby facilitate the warp of bush 144 itself. Thus, the pivotal motions of the link 27 at the pivot 29 can be smoothened to enhance the functioning thereof.

It is contemplated that in the third embodiment of the invention the pivot at the engine side may be made of a rubber bush.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. In a motorcycle of the type in which a power unit is constructed integrally of an engine, a crankcase and a transmission case and which is swingable with respect to a frame together with a rear wheel, said rear wheel being supported by said power unit at a rear portion thereof and connected to said frame through a shock absorber; an engine supporting structure wherein:
   said engine has the main axis of inertia thereof directed substantially in the longitudinal direction of said motorcycle;
   at least one link is provided, said link having the lower portion thereof pivotally connected to said engine through a lower pivot and the upper portion thereof pivotally connected to said frame through an upper pivot;
   said lower pivot and said upper pivot are arranged on a substantially vertical line so as to permit movement of said power unit, substantially in the direction of said main axis of inertia of said engine;
   a stopper is provided on each said link; and
   a member is provided on said frame in operative cooperation with each said stopper so as to regulate the pivotal motions of each said link.

2. A motorcycle according to claim 1, wherein:
   a pair of brackets are provided to depend from said frame;
   a pair of supporting projections project respectively from both sides of an upper portion of said engine; and
   a pair of said links each have said upper portion thereof pivotally connected to one of said brackets through said upper pivot and said lower portion thereof pivotally connected to one of said supporting projections through said lower pivot, said upper and lower pivots of said pair of links being substantially aligned with each other.

3. A motorcycle according to claim 1, wherein: rubber bushes are interposed between the upper pivot of said links and said frame and between the lower pivot of said links and said engine.

4. A motorcycle according to claim 1, wherein: rubber bushes are interposed between the upper pivot of said links and said frame; and
   bearings are interposed between the lower pivot of said links and said engine.

5. A motorcycle according to claim 1, wherein: bearings are interposed between the upper pivot of said links and said frame and between the lower pivot of said links and said engine.

6. A motorcycle according to claim 4 or 5, wherein: said bearings comprise ball bearings.

7. A motorcycle according to claim 1, wherein: each said stopper provided on each said link is integrally formed with said link so as to extend forwardly of said upper pivot; and
   each said member provided on said frame and operatively cooperating with each said stopper comprises a stud element.

8. A motorcycle according to claim 7, wherein: each said stud element is provided with a cushion rubber mounted thereon.

9. A motorcycle according to claim 8, wherein:
   a predetermined clearance is normally defined between the outer circumference of each said cushion rubber and each said stopper on said link.

10. A motorcycle according to claim 1, wherein:
    each said stopper provided on each said link comprises a collar element fixed to a front portion of said link;
    each said member provided on said frame and operatively cooperating with each said stopper comprises a stud element projecting from said frame; and
    a rubber bush is provided between each said collar element and each said stud element.

11. A motorcycle according to claim 10, wherein:
    each said rubber bush is formed with hollow portions extending substantially in the direction of pivotal motion of each said link so as to attenuate vibrations caused by said pivotal motion of each said link.

12. In a motorcycle of the type in which a power unit is constructed integrally of an engine, a crankcase and a transmission case and which is swingable with respect to a frame together with a rear wheel, said rear wheel being supported by said power unit at a rear portion thereof and connected to said frame through a shock absorber; an engine supporting structure wherein:
    said engine has the main axis of inertia thereof directed substantially in the longitudinal direction of said motorcycle;
    at least one link is provided, said link having the lower portion thereof pivotally connected to said engine through a lower pivot and the upper portion thereof pivotally connected to said frame through an upper pivot;
    said lower pivot and said upper pivot are arranged on a substantially vertical line so as to permit movement of said power unit substantially in the direction of said main axis of inertia of said engine; and
    stoppers are provided in front of the upper pivot of said links and corresponding stoppers are provided on said frame to thereby regulate the pivotal motions of said links.

13. A motorcycle according to claim 12, wherein: cushion rubbers are mounted on said stoppers.

14. In a motorcycle of the type in which a power unit is constructed integrally of an engine, a crankcase and a transmission case and which is swingable with respect to a frame together with a rear wheel, said rear wheel being supported by said power unit at a rear portion thereof and connected to said frame through a shock absorber; an engine supporting structure wherein:
    said engine has the main axis of inertia thereof directed substantially in the longitudinal direction of said motorcycle;
    at least one link is provided, said link having the lower portion thereof pivotally connected to said engine through a lower pivot and the upper portion thereof pivotally connected to said frame through an upper pivot;
    said lower pivot and said upper pivot are arranged on a substantially vertical line so as to permit movement of said power unit substantially in the direction of said main axis of inertia of said engine;
    stopper collars are provided in front of the upper pivot of said links; and
    stopper rubber bushes provided on said frame are fitted in said collars such that they can be warped in the direction of the pivotal motions of said links.

* * * * *